United States Patent Office 2,862,699
Patented Dec. 2, 1958

2,862,699

BORING TYPE MINERS WITH CUTTING PATH MODIFYING MEANS

Joseph J. Slomer, Chicago, Ill., assignor to Goodman Manufacturing Company, Chicago, Ill., a corporation of Illinois Application December 24, 1956, Serial No. 630,254

5 Claims. (Cl. 262—7)

This invention relates generally to a boring type miner and more particularly to improvements therein whereby the cutting path or the direction of the boring arms may be modified.

In the improved versions of the McKinlay boring type miner as shown in Cartlidge Patent No. 2,757,917, issued August 7, 1956, the miner is mounted for tramming movement upon crawler treads, which are operable not only for the crowding movement of the machine against the seam of coal or the like, but also for tramming movement within the mine from one working room to another. Such machines are also used for entry driving, and in such use it is desirable to have the machine operate on a short radius in effecting a turn from one entry to a cross entry. Also, in advancing a room it is desirable to augment the action of the boring arms, so that a wider cut is provided than that which would be afforded by reason of the size and length of the boring arms alone.

According to the present invention the cutting action of the boring arms can be augmented for either effecting a turn of short radius or effecting a wider cut. Such action can be automatic if desired or wholly within the control of the operator. According to the present invention the fluid supplied for operation of the crawler tread motors is augmented, preferably automatically, by an additional pulse or surge of pressure fluid, so as to cause the crawler tread driven by such motor to cause the machine to swing a small amount upon a vertical axis taken through the machine.

The mechanism according to the present invention preferably includes a cam mounted upon one of the boring arm shafts (if there be two), and having the cam operate with a follower piston arranged to give the aforesaid pulse of additional motor fluid.

One of the principal objects of this invention is to provide an improved boring type miner characterized by the ability to augment the normal boring action of the boring arms so as to provide a wider bore. Another object is to provide a structure whereby the action of the boring arms and the crawler treads in describing a curve when cutting entries or the like can be augmented whereby the radius of such curve is made shorter.

Other objects and important features of the invention will be apparent from a study of the specification following taken with the drawings which together describe and illustrate a preferred embodiment of the invention and what is now considered to be the best mode of practicing the principles thereof. Other embodiments of the invention may be suggested to those having the benefit of the teachings herein, and such other embodiments are intended to be reserved especially as they fall within the purview and spirit of the subjoined claims.

In the drawings:

Fig. 6 shows a valve embodied in the hydraulic circuit of Fig. 2 whereby pulses are obtained to give the augmented action of the boring arms;

Fig. 7 is a view similar to Fig. 6 but showing the valve in position so that the pulse of pressure fluid is applied to only one of the crawler treads, whereby the miner will travel a path of shorter radius; and Fig. 8 is a view similar to Figs. 6 and 7, but showing the position of the valve for causing the pulse to be applied to the other crawler tread, so as to cause the miner to turn along a correspondently short radius in a different direction.

Figure 1:
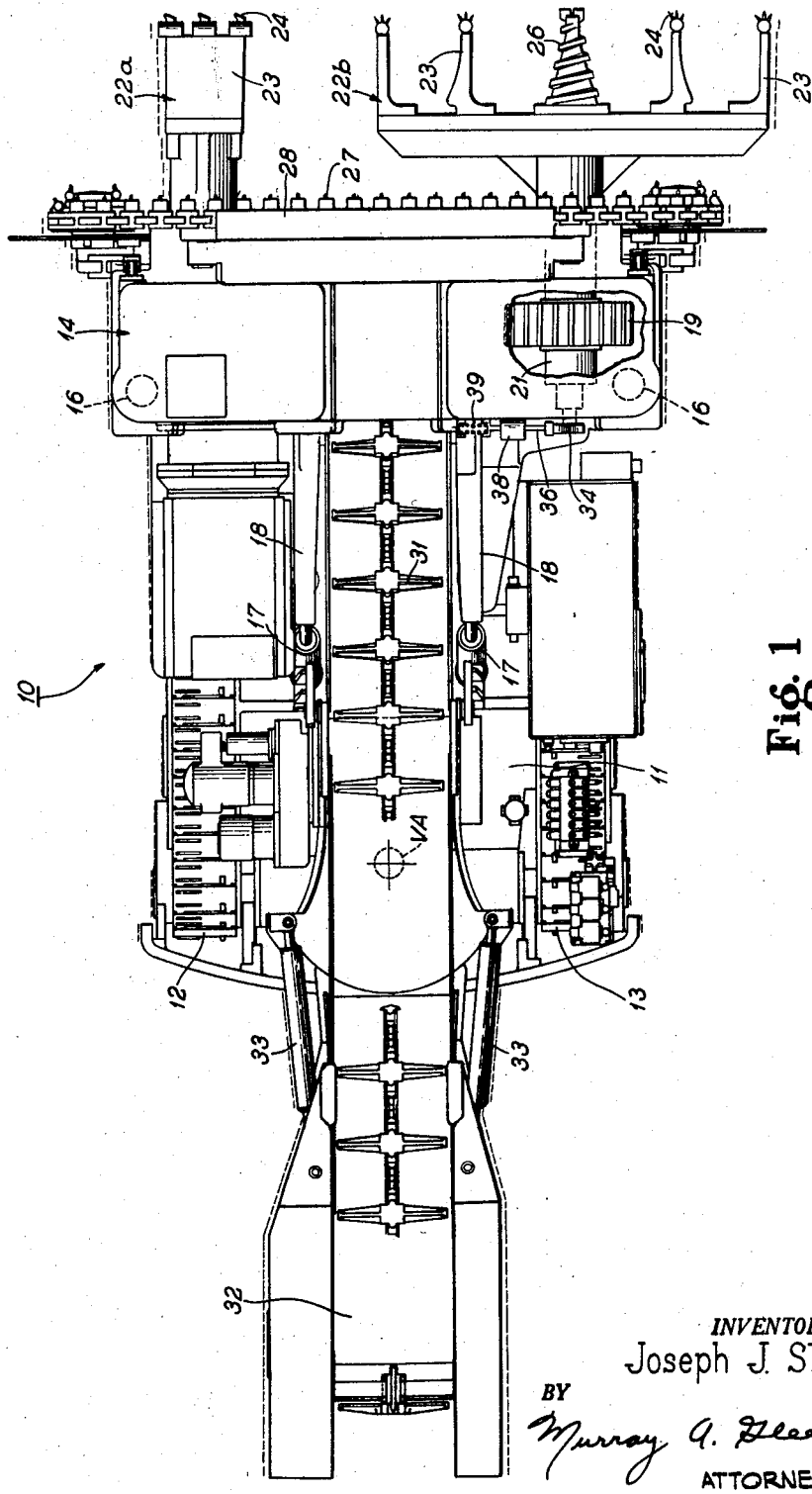
Fig. 1 is a plan view of a boring type miner having the improvements according to the present invention embodied therein.

Referring now to Fig. 1 of the drawings, the improvements according to the present invention are embodied in a boring type miner indicated generally by the reference numeral 10. Such a miner includes a main frame 11 mounted for movement upon laterally spaced crawler treads 12 and 13. A boring head 14 is mounted for movement with respect to the main frame 11, the position thereof being determined by main lifting jacks 16 and rear tilting jacks 17. Arms 18 extend rearward from the auxiliary frame 14, and the tilting jacks 17 operate between the main frame 11 and the rearward extending arms 18.

The boring head 14 includes a housing for driven gears 19 fast upon shafts 21 extending forward of the boring head 14, and having mounted thereon boring arms indicated generally by the reference numerals 22a and 22b. Each boring arm 22a or 22b has supports 23 for cutter bits 24 which cut annular kerfs in a seam of coal or the like. A central pilot cutter 26 is mounted at the turning center of each boring arm for cutting a pilot bore.

The two boring arms 22a and 22b rotate in opposite directions so as to cut a pair of contiguous bores in the seam. In order to cut the cusps remaining from the operation of the boring arms a cutter chain 27 is provided which is guided in an upper cutter chain guide 28 and a lower cutter chain guide 29, see also Fig. 2.

The operation of the boring arms 22a and 22b and the endless cutter chain 27 is such as to fragment coal or other mineral from a solid seam and to direct same to a central throat, not seen, disposed beneath the boring head 14, the cuttings being removed therefrom by an endless flight conveyor 31. Said conveyor is arranged to discharge its contents from a discharge boom 32 which pivots about a vertical axis VA by means of swing cylinders 33.

Details of operation of such machine may be as shown in the aforesaid Cartlidge patent and improvement patents thereover, so that further details of the machine are not necessary for purposes of describing the within invention.

The boring shaft 21 seen in Fig. 1 has mounted thereon an elliptical shaped cam 34 which turns therewith. The cam 34 has a piston rod follower 36 having a piston 37 mounted thereon movable within a cylinder 38, see also Fig. 2, and the piston rod follower 36 is urged into contact with the cam 34 by means of a spring 39 having one end abutting the boring head 14 and its other end abutting the piston rod follower 36. The details of the function of the piston rod follower 36, the piston 37 and the cam 34 will be described in more detail as this specification proceeds, but as a general thing it may be stated that its purpose is to provide an additional surge or pulse of hydraulic pressure fluid to augment the action of the boring arms 22a and 22b so that the ends of the boring arms do not follow the normal trace T but rather a trace T'.

Figure 2:
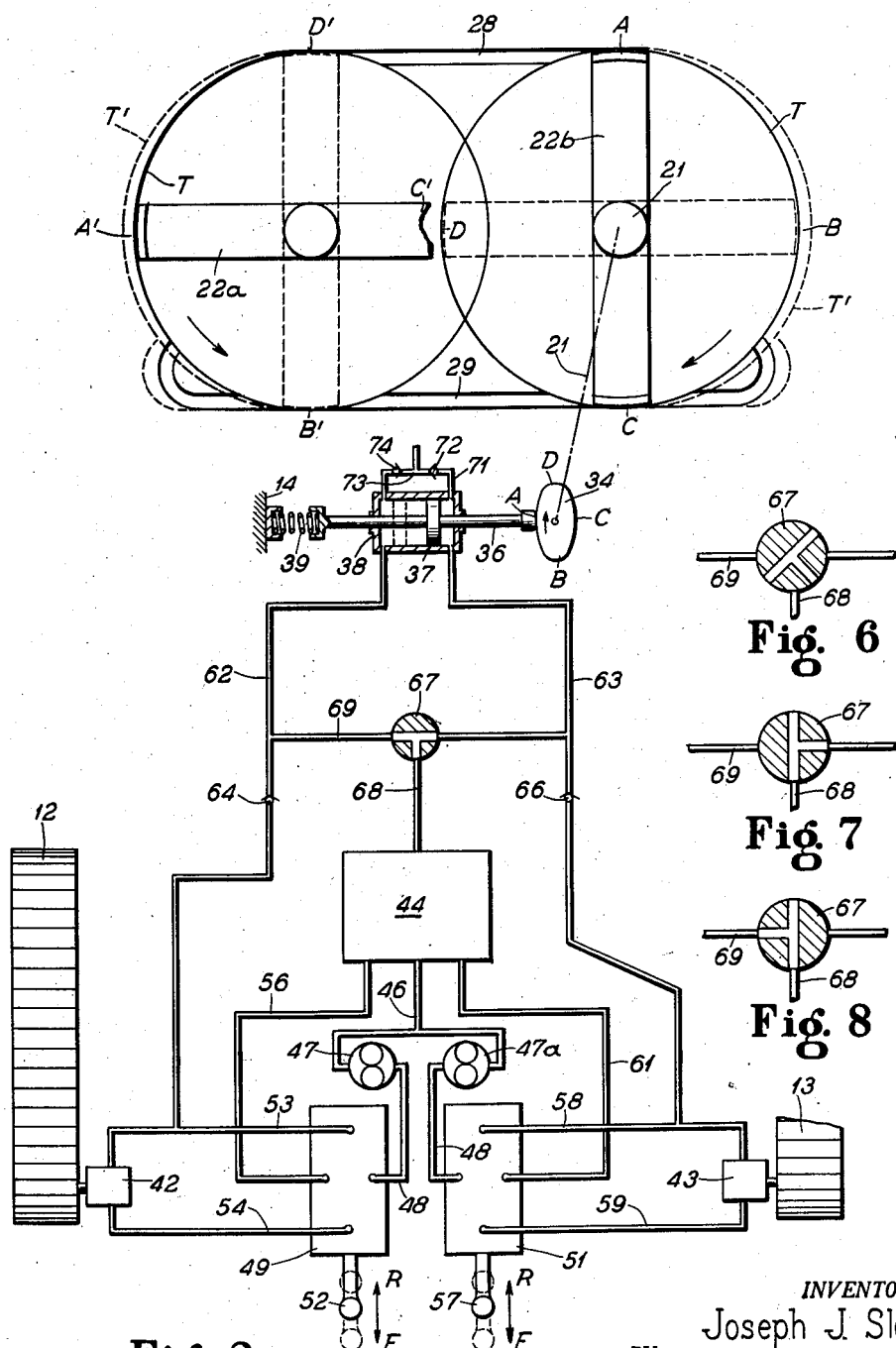
Fig. 2 is a schematic view of the boring arms and means operable therewith for augmenting the action thereof so as to achieve a wider bore, together with a hydraulic circuit controlling the action of crawler treads of the miner seen in Fig. 1 so as to provide such augmented action of the boring arms.

Referring now to Fig. 2 of the drawings, the crawler treads 12 and 13 are driven respectively by fluid motors 42 and 43. Pressure fluid for driving the motors 42 and 43 is supplied from a tank or reservoir 44 connected by a conduit 46 to pumps 47 and 47a. The output from the pumps 47, 47a is connected by pressure lines 48, 48 to a control valve 49 for the motor 42 and a control valve 51 for the motor 43. Control valve 49 has an actuating plunger 52 therein which has forward and reverse positions shown. When plunger 52 is in the forward position pressure fluid is supplied through the valve 49 to the motor 42 by a working line 53, the spent fluid from the motor 42 returning to the valve 49 by means of a line 54, thence through the valve 49 and to tank 44 by a tank line 56.

When the valve plunger 52 is moved to the reverse position shown, line 54 becomes a working line to motor 42 and line 53 becomes an exhaust line from the motor 42. In the neutral or centered position of the valve 49, pressure fluid from pump 47 is bypassed through the valve 49 directly from line 48 to tank line 56.

The control valve 51 for the other motor 43 driving the opposite crawler tread 13 likewise has a valve plunger 57 which when moved to the forward operating position causes pressure fluid to be supplied through the valve 51 to motor 43 by a working line 58, the spent fluid from the motor 43 returning to the valve 51 by a line 59, the spent fluid being returned to the tank 44 from the valve 51 by tank line 61. As with the valve 49, when the plunger 57 is moved to the reverse position the motor 43 is driven in the opposite direction and the line 59 becomes a working line and the line 58 an exhaust line therefrom. Valve 51 is constructed like valve 49 and in the neutral position bypasses pressure fluid from pump 47a to tank 44.

During the forward operation of the miner 10 the size of the bores cut by the arms 22a and 22b can be augmented by an additional surge or pulse of pressure fluid given to the crawler tread motors 42 and 43 in an alternate fashion. For example, when cutting arm 22a is in a horizontal position and the cutting arm 22b is in a vertical position a pulse of pressure fluid can be given to the crawler tread motor 42 to augment the cutting action of the boring arm 22b. Contrariwise, when the boring arm 22b is in the horizontal position and the boring arm 22a is in the vertical position a pulse of pressure fluid can be given to the crawler tread motor 43 driving the crawler tread 13 to give the extra boring action as indicated by the trace T'.

The pressure cylinder 38 accordingly has a pressure line 62 connected at one end thereof to the conduit 53 supplying the crawler tread motor 42. The opposite end of the cylinder 38 likewise has a line 63 connected to the line 58 of the valve 51 to the crawler tread motor 43. Check valves 64 and 66 are connected respectively in the lines 62 and 63 to trap fluid when the crawler treads 12 and 13 are operated in the reverse direction. The two lines 62 and 63 are connected through a valve 67 to a line 68 to the tank 44, the valve 67 being connected in a conduit 69 bridging the two conduits 62 and 63.

The hydraulic pressure system described for operating the crawler treads 12 and 13 is arranged to receive pulses of additional pressure fluid effective in alternate fashion to the crawler tread motors 42 and 43 to cause the miner 10 to have what might be considered oscillation in a horizontal plane. This oscillation facilitates the wedging action of the boring arms, and has the added result of additionally fracturing the seam.

The additional pulses of hydraulic pressure are created by the cam 34 turning with the shaft 21 for boring arm 22b. The cam 34 cooperates with the piston follower 36 and piston 37 within cylinder 38 as will now be described.

During crowding movement of the miner 10 the valves 49 and 51 are moved to the forward position, and valve 67 moved to the blocked position seen in Fig. 6. By way of example, cam 34 has the position shown when boring arm 22b is in the vertical position shown, see also Fig. 3. As it revolves in a clockwise direction, cam 34 rotates in the same direction, and as the piston rod 36 and piston 37 are moved to the left, a pulse of additional pressure fluid moves past check valve 64 to be supplied to fluid motor 42 driving tread 12.

The extra pulse given to the motor 42 is effective to oscillate the miner 10 as previously described to cause the upper end of boring arm 22b to follow the trace T' instead of the usual trace T.

During the aforesaid stroke of the piston 37, the right end of the cylinder 38 is supplied with fluid from the tank 44 by means of a line 71 having a check valve 72 therein.

While the arm 22b is rotating in the fashion described arm 22a will be rotating in a counterclockwise direction, and while arm 22b has rotated from position A to position B, arm 22a will rotate from C' to D'. Cam follower 36 will at such time be in position B on cam 34 with piston 37 to its leftmost position.

Figure 3:
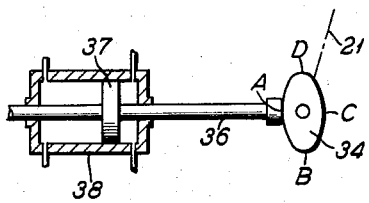
Fig. 3 is a schematic view showing the cycle of operations incident to obtaining the augmented operation of the boring arms, and showing a pressure cylinder for obtaining such augmented action.

As cam 34 continues to rotate, see also Fig. 3, piston 37 will be urged to the right to supply a pulse of additional pressure fluid to line 63 and to motor 43 past check valve 66. Check valve 72 will be seated at this time. The point C' on arm 22a will have rotated from the top of the bore to the bottom at B'.

During this past described stroke of piston 37, the left end of cylinder 38 will be supplied with makeup fluid from tank 44 by a line 73 branching from tank line 71 and having a check valve 74 therein.

At the conclusion of this stroke of piston 37 piston rod follower 36 will be in contact with point C on cam 34, and the lower end of boring arm 22b at point C will have rotated to the upper part of the bore at D.

The cycle between points C and D on cam 34 for arm 22b is identical to the cycle between points A and B thereon. Likewise, the cycle between points B and C on cam 34 for arm 22a is identical to the cycle between points D and A thereon.

It will thus be seen that the rotation of cam 34 and the operation thereby of piston 37 in cylinder 38 gives two pulses of hydraulic fluid to motor 43 of tread 13 effective to increase the cutting trace of arm 22a, and two pulses effective to increase the cutting trace of arm 22b.

The apparatus of the invention is also effective to decrease the turning radius of the miner in cutting cross entries. To this end the pulses of fluid are directed to one crawler tread motor only, and by way of example, to turn left sharply the additional pulses are applied to the right crawler tread only, and vice versa.

As seen in Fig. 2, to effect a sharp turn to the left, valve 49 is cracked to supply a small amount in the forward direction to supply motor 42, while valve 51 is operated to the full forward position to supply motor 43. At the same time valve 67 is actuated to the position seen in Fig. 8 so that the pressure pulses are available to the right hand motor 43 to augment its tramming action. At such time the right hand branch only of the pulsing circuit is available, and any pressure developed in the left hand branch at cylinder 38 is ported to tank by valve 67.

To effect a turn to the right, valve 67 is operated as seen in Fig. 7 and the left hand crawler tread motor 42 only is pulsed. At such time the left hand branch is pulsed by cylinder 38 while the right hand branch is ported to tank past valve 67.

Figure 4:
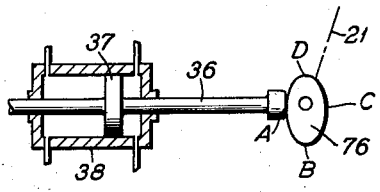
Fig. 4 shows a cam of a different contour for giving a different action to the boring arms from that experienced with the use of the cam seen in Fig. 3.

Referring now to Fig. 4 of the drawings there is shown another form of a cam 76 to give the extra cutting trace by one end only of the arms 22a and 22b if desired. Such would be indicated where the frequency of the pulses need not be as great.

Figure 5:
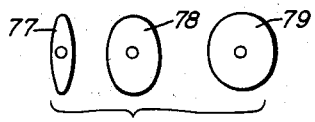
Fig. 5 shows alternate forms of cams for giving pulses of a desired kind whereby the action of the boring arms may be augmented to a greater or less degree.

In Fig. 5 there are shown various forms of cams 77, 78 and 79 which are suitably contoured to vary the duration and intensity of the pulse of additional pressure fluid.

From the foregoing description it will be evident that there has been provided some new and useful improvements in mining machines. The structures according to the invention can be employed for augmenting the action of the boring arms so as to provide a wider bore or for decreasing the turning radius in cutting cross entries.

While the invention has been described in terms of some preferred embodiments thereof its scope is intended to be limited only by the claims here appended.

I claim as my invention:

1. In a boring type miner, a main frame, a boring head mounted on said main frame and having a pair of boring arms extending therefrom for cutting mineral from the solid seam thereof, crawler treads for moving said miner including a fluid motor for driving each crawler tread, a source of pressure fluid including a pump for pressurizing said fluid, a control valve controlling the admission of pressurized fluid to each fluid motor, the improvement in such miner for increasing the size of the bore beyond that incident to the dimensions of the boring arms which comprises means for supplying auxiliary pressurized fluid to said fluid motors in the form of timed pulses comprising a cylinder and a double acting piston therein, and cam means operating in timed relationship to said boring arms and operatively connected to said piston to cause the same to sweep auxiliary pressurized fluid alternately to said fluid motors as pressure impulses.

2. In a boring type miner, a main frame, a boring head mounted on said main frame and having a pair of boring arms extending therefrom for cutting mineral from the solid seam thereof, crawler treads for moving said miner including a fluid motor for driving each crawler tread, a source of pressure fluid including a pump for pressurizing said fluid, a control valve controlling the admission of pressurized fluid to each fluid motor, the improvement in such miner for increasing the size of the bore beyond that incident to the dimensions of the boring arms which comprises means for supplying auxiliary pressurized fluid in the form of timed impulses to said fluid motors comprising an auxiliary pump, and means operating in timed relationship to said boring arms for causing the output from said auxiliary pump to be connected alternately to said fluid motors in the form of a pressure impulse.

3. In a boring type miner, a main frame, a boring head mounted on said main frame and having a pair of boring arms extending therefrom for cutting mineral from the solid seam thereof, crawler treads for moving said miner including a fluid motor for driving each crawler tread, a source of pressure fluid including a pump for pressurizing said fluid, a control valve controlling the admission of pressurized fluid to each fluid motor, the improvement in such miner for increasing the size of the bore beyond that incident to the dimensions of the boring arms which comprises means for supplying auxiliary pressurized fluid to said fluid motors in timed pulses which alternate between said fluid motors.

4. In a boring type miner, a main frame, a boring head mounted on said main frame and having a pair of boring arms extending therefrom for cutting mineral from the solid seam thereof, crawler treads for moving said miner including a fluid motor for driving each crawler tread, a source of motive fluid including a pump for placing pressure on said fluid, a control valve controlling the admission of pressurized fluid to each fluid motor, the improvement in such boring miner whereby the radius of turning can be effectively decreased which comprises means for supplying auxiliary pressurized fluid to the fluid motor remote from the turning center of the miner in pulses including a cylinder and a double acting piston therein, cam means operating in timed relationship to said boring arms for causing said piston to sweep auxiliary pressurized fluid, and auxiliary valve means for causing the auxiliary pressurized fluid to be directed to said remote motor.

5. In a boring type miner, a main frame, a boring head mounted on said main frame and having a pair of boring arms extending therefrom for cutting mineral from the solid seam thereof, crawler treads for moving said miner including a fluid motor for driving each crawler tread, a source of motive fluid including a pump for placing pressure on said fluid, a control valve controlling the admission of pressurized fluid to each fluid motor, the improvement in such boring miner whereby the radius of turning can be effectively decreased which comprises means for supplying auxiliary pressurized fluid to the fluid motor remote from the turning center of the miner in pulses including an auxiliary pump, cam means operating in timed relationship to said boring arms and operatively connected with said auxiliary pump and means connected between said auxiliary pump and said remote motor for directing the output from said auxiliary pump to said remote motor.

References Cited in the file of this patent

UNITED STATES PATENTS

| 2,004,928 | Centervall | June 18, 1935 |
| 2,446,242 | Orshansky | Aug. 3, 1948 |
| 2,763,164 | Neklutin | Sept. 18, 1956 |

OTHER REFERENCES

"Coal Age," pages 84–87, December 1948.